United States Patent [19]

Hansen

[11] Patent Number: 5,391,349
[45] Date of Patent: * Feb. 21, 1995

[54] METHOD FOR INHIBITING CORROSION OF METAL IMBEDDED IN CONCRETE

[76] Inventor: Charles N. Hansen, 1448 S. 1700 East, Salt Lake City, Utah 84108-2602

[*] Notice: The portion of the term of this patent subsequent to Jan. 4, 2011 has been disclaimed.

[21] Appl. No.: 151,210

[22] Filed: Nov. 12, 1993

[51] Int. Cl.⁶ .................. C23F 11/00; C23F 11/08
[52] U.S. Cl. ........................... 422/7; 106/14.18; 106/14.21; 252/387
[58] Field of Search .......... 422/7, 12, 13, 14, 18; 106/14.15, 14.18, 14.21; 252/70, 387, 389.62, 392

[56] References Cited

U.S. PATENT DOCUMENTS

| | | | |
|---|---|---|---|
| 3,971,628 | 7/1976 | Bresle | 422/7 |
| 4,698,173 | 10/1987 | Hansen | 252/70 |
| 5,270,661 | 12/1993 | Burnett | 324/527 |
| 5,275,752 | 1/1994 | Hansen | 252/70 |

OTHER PUBLICATIONS

Y. K. Gouda et al., "A Rapid Method of Study Corrosion Inhibition of Steel in Concrete", Journal of PCA Research & Dev't. Laboratories, Ser. 1175, pp. 24–31 (Sep. 1965).
B. Tremper, "Corrosion of Reinforcing Steel", ASTM Special Technical Pub. No. 169-A, Significance of Test & Properties of Concrete Making Materials, pp. 220–229 (publication date unknown).
John D. Mozer et al., "Corrosion of Reinforcing Bars in Concrete", Journal of the American Concrete Institute, Title No. 62-54, pp. 909–930 (Aug. 1965).
John G. Hendrickson, "Corrosion of Steel in Concrete", Portland Cement Association (Jun. 1968).
"Effect of Various Substances on Concrete and Protective Treatments, Where Required", Portland Cement Association General Information (Dec. 1968).
S. Dressman et al., "Screening Test for Rebar Corrsion Inhibitors", Transportation Research Board, Record No. 1304, pp. 135–139 (1991) (Abstract only).
J. Dillard et al., "Surface Characterization of Reinforcing Steel and the Interaction of Steel with Inhibitors in Pore Solution", Transpation Research Board, Record No. 1304, pp. 122–128 (1991) (Abstract only).
F. Tomosawa et al., "Experimental Study on the Effectiveness of Corrosion Inhibitor in Reinforced Concrete. Admixtures for Concrete: Improvement of Properties", Chapman & Hall, London, England, pp. 382–391 (1990) (Abstract only).
R. Buchholz, "Effects of Lignosulfonates in Deicing Salts on the Penetration of Chloride Ions into Concrete", Transportation Research Board Record No. 1268, pp. 186–192 (1990) (Abstract only).
M. Callahan, "Deicing Salt Corrosion with and without Inhibitors", Transportation Research Board Record No. 1211, pp. 12–17 (1989) (Abstract only).
G. Jayaprakash et al., "Electro–Osmotic Techniques for Removal of Chloride from Concrete and for Emplacement of Concrete Sealants", Kansas Dept. of Transportation, Report No. FHWA-KS-82-2 (Aug. 1982) (Abstract only).

*Primary Examiner*—Robert J. Warden
*Assistant Examiner*—Robert Carpenter
*Attorney, Agent, or Firm*—Dowell & Dowell

[57] ABSTRACT

The corrosion of ferrous-based metals imbedded in concrete containing a chloride is inhibited by drawing the chlorides away from the metal, and then applying a composition containing ammonium carbamate or ammonium carbonate to the concrete. An agent may be added to the solution to prevent any calcium hydroxide contained in the concrete from precipitating the corrosion inhibitor.

23 Claims, No Drawings

METHOD FOR INHIBITING CORROSION OF METAL IMBEDDED IN CONCRETE

BACKGROUND OF THE INVENTION

This invention relates to controlling corrosion and, more particularly, to a method for inhibiting the corrosion of ferrous-based materials imbedded in concrete containing a chloride.

In the United States, billions of dollars have been spent in the construction of highways, freeways and their associated overpasses and bridges. One of the most important problems facing the nation is determining how to maintain the integrity of this system of roads and associated structures at an acceptable cost.

A problem which reduces the integrity of roadways, related structures and buildings located near sources of saltwater, is the corrosion of the contained reinforcing material by chloride-based deicers, seawater and other sources of chlorides. These substances continuously attack the reinforcing materials within concrete, causing the roadways and structures to degrade and ultimately fail prematurely. At a potential cost of billions of dollars, the nation is confronted with the task of repairing its highway system and other structures by removing the corroding reinforcing steel and replacing it with new reinforcing material. Yet, if the corroded steel is not replaced and corrosion is allowed to continue to critical stages, the road surfaces and structures may potentially fail catastrophically with associated human losses.

In an effort to avoid such failures and possibly to find a less expensive solution than replacing the reinforcing materials, much research has been conducted to learn how to stop the corrosion of steel imbedded in concrete. Among the publications reporting such work are the following: Mozer, Bianchi and Kesler, "Corrosion of Reinforcing Bars in Concrete," *Journal of American Concrete Institute*, August, 1965; Tremper, "Corrosion of Reinforcing Steel"; ASTM Special Technical Publication No. 169-A; *Significance of Test and Properties of Concrete Making Materials*; Spellman and Stratful, "Concrete Variables and Corrosion Testing," California Department of Public Works, Division of Highways, Materials and Research Department, Research Report No. M & R 635116; Gouda and Monfore, Journal of PCA Research and Development Laboratories, Ser. 1175, September, 1965. In addition to these publications, on August 14, 1992, DIALOG INFORMATION SERVICES published abstracts of publications which describe various tests and research projects directed to the problem of inhibiting the corrosion of steel imbedded in concrete. The abstracts describe, for example, using sodium nitrite, calcium nitrite, the lignosulphonates, and calcium magnesium acetate as corrosion inhibitors.

The published literature appears to indicate that concrete, alone, inhibits the corrosion of imbedded reinforcing steel. The corrosion may in some instances be chemical, but it is more commonly electrochemical in nature. The area of the steel where metal ions go into solution in an amount chemically equivalent to the reaction at cathodic regions is the anodic region. If the metal is iron, it goes into solution and forms ferrous ions, $Fe^{++}$, plus two electrons, $2e^-$, to maintain an equilibrium of electrical charges. An equivalent quantity of hydrogen is plated out as a thin film at the adjacent surface regions of the metal known as the cathode. This thin film of hydrogen inhibits further corrosion of the iron surface. The anodic and cathodic reactions are summarized as follows:

$$\text{At anode: } Fe \rightarrow Fe^{++} + 2e^- \tag{1}$$

$$\text{At cathode: } 2H^+ + 2e^- \rightarrow H_2 \tag{2}$$

The reaction at the cathode regions is relatively slow in alkaline media because the concentration of hydrogen is very low. This reaction rate is increased, however, by the depolarizing action of dissolved oxygen according to the following reactions:

$$2H^+ + \tfrac{1}{2}O_2 + 2e^{31} \rightarrow H_2O \tag{3}$$

$$Fe + H_2O + \tfrac{1}{2}O_2 \rightarrow Fe(OH)_2 \tag{4}$$

$$\tfrac{1}{2}O_2 + H_2O + 2e^- \rightarrow 2OH^- \tag{5}$$

The corrosion rate is proportional to the oxygen concentration, and the quantity of electricity flowing through the local galvanic cells is equivalent to the amount of metallic corrosion. With increasing anodic polarization, the overall corrosion of the metal diminishes. In ordinary conditions of reinforcing steel in concrete, where pH is high and the hydrogen ion concentration is low, and where there is essentially no oxygen supply, an anodic coating forms on the steel and stops the corrosion reaction. When chloride deicing salts are present, however, the protective iron oxide and hydrogen films are removed from the steel surface by forming soluble chloride compounds. The loss of these protective films exposes the iron or steel surface to further electrochemical attack.

Gouda and Monfore have stated, "Since areas that corrode are anodic, valuable information may be obtained on a macroscopic scale by forcing the whole metal to be anodic. This can be accomplished by applying an external voltage between the metal as an anode and an auxiliary electrode as cathode. Polarization current densities of from 1 to 1000 micro-amperes per $cm^2$ are usually applied in such tests, presumably by approximating the values encountered in actual local cells."

Iron is above hydrogen in the electromotive force series, and corrodes readily when not imbedded in concrete and exposed to either oxygen or to hydrogen ions. Water in the open atmosphere may contain both hydrogen ions and dissolved oxygen, and thus may corrode steel.

The difficulty of developing an inhibitor to stop the corrosion of steel in concrete is evident from the amount of unsuccessful research which has so far been conducted. In the publication by Mozer, Bianchi and Kesler entitled "Corrosion of Reinforcing Bars in Concrete", the authors explain at page 927 that:

"Anodic inhibitors contain materials such as alkalies, phosphates and chromates which form either iron salts or a ferric oxide film on the anodic surface thus preventing ferrous ions from entering the solution. Such anodic inhibitors are effective only in high concentrations. If they are added in insufficient quantities, the corrosion reaction may be locally intensified. On the other hand, high concentrations may adversely affect the concrete. Therefore, the use of conventional anodic inhibitors cannot be recommended until more complete and fundamental investigations have been conducted."

In light of this statement, to avoid the local intensification of the corrosion reaction, the inhibitor should cover the entire surface of the steel and, furthermore, should not deleteriously affect the surrounding concrete.

SUMMARY OF THE INVENTION

The present invention has been made in view of the above-explained inadequacies of the known art and has as an object to provide a method of inhibiting the corrosion of metal imbedded in concrete containing chlorides, without adversely affecting the concrete.

Additional objects and advantages of the present invention will become apparent from the description which follows, or by practice of the invention.

To achieve the objects of invention, as embodied and broadly described herein, the method for inhibiting corrosion of a metal imbedded in concrete which contains a chloride according to the invention comprises:

applying water to the concrete to draw chloride ions away from the metal and into the water;

making the metal cathodic to draw chloride ions away from the metal and into the water;

removing the water containing chloride ions; and applying a composition comprising ammonium carbonate to the concrete.

Further to achieve the objects of the invention as embodied and broadly described herein, the method for inhibiting the corrosion of a metal imbedded in concrete which contains a chloride, comprises the steps of:

applying water to the concrete to draw chloride ions away from the metal and into the water;

removing the water containing chloride ions; and applying a composition comprising ammonium carbamate to the concrete.

DETAILED DESCRIPTION OF THE PREFERRED EMBODIMENT

U.S. Pat. No. 5,275,752 to Hansen discloses using ammonium carbamate as an inhibitor for the corrosion of steel by chlorides, and U.S. patent application Ser. No. 08/137,931 to Hansen, filed Oct. 19, 1993, discloses using ammonium carbonate for this same purpose.

These applications to Hansen disclose that at least one part of ammonium carbamate or ammonium carbonate is required to inhibit the corrosion of one part of sodium chloride, or 0.6 parts of chloride. To stop the corrosion of steel, it is important to reduce the concentration of the chlorides in the vicinity of the steel, and to transport the inhibitor to the steel at a sufficient concentration. In view of these and other objectives, tests were conducted to determine a method to stop the corrosion of steel which is imbedded in concrete.

The problems associated with inhibiting the corrosion of steel imbedded in concrete can be better understood by knowing the chemistry of ammonium carbamate and the ammonium carbonates, and knowing that these two chemicals may react with any lime or calcium hydroxide produced in concrete during setting.

Ammonium carbamate, $NH_2COONH_4$, is produced by reacting two moles of ammonia with one mole of carbon dioxide under high pressure conditions. An important characteristic of ammonium carbamate is that it may hydrate to ammonium carbonate. In "Urea Its Properties and Manufacture," George Tsei-yu Chao explains at page 202 that:

"It is a generally wrong impression that ammonium carbamate will combine with water to form ammonium carbonate very quickly. However, the facts show that ammonium carbamate is a much more stable compound than ammonium carbonate. The rate of hydration of ammonium carbamate is very slow, not only in the solid state, but also in a water solution. The reaction of ammonium carbamate with water reaches a limit after long standing." (Emphasis added).

Chao further explains on page 204 that "The effect of time on the degree of hydration of ammonium carbamate was studied for around 2 and 6 per cent solutions . . . Even at such dilute concentrations, the hydration never exceeds 80 per cent even after 24 hours".

According to Chao, the hydration of ammonium carbamate produces a double salt known as ammonium carbonate. The double salt is one part ammonium carbamate and one part ammonium bicarbonate, and forms according to the chemical reaction:

Ammonium carbamate is more stable than ammonium carbonate, and it probably has to hydrate to ammonium carbonate to become reactive. Less than 80% of the ammonium carbamate hydrates, even in a 2% to 6% solution, and only one-half of the double salt that is produced is the reactive compound ammonium bicarbonate. The release of ammonia explains the fact that excess ammonia inhibits the hydration of ammonium carbamate to ammonium carbonate.

Using the information provided by Chao, the following calculations estimate the conditions which may exist in a 3% water solution of ammonium carbamate and ammonium carbonate that is allowed to stand for at least 24 hours.

From a 3% solution, 80% of the ammonium carbamate may hydrate, and the associated ammonia released will react with the water to produce ammonium hydroxide. The following chemical reaction gives the calculated products based on ammonium carbamate having a molecular weight of 78, water of 18, ammonium bicarbonate of 79 and ammonium hydroxide of 35.

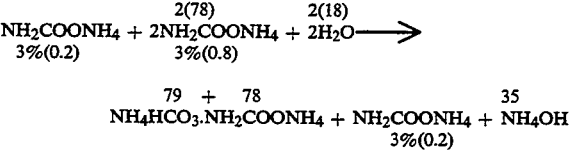

The resulting products of this reaction would be:

(a) $[(3\% \times 0.8)/(2 \times 78)] \times (78+79) = 2.42\%$ of the double salt which consists of 1.2% ammonium carbamate and 1.22% of ammonium bicarbonate;

(b) $[(3\% \times 0.8)/(2 \times 78)] \times 35 = 0.54\%$ of ammonium hydroxide; and (c) $3\% \times 0.2 = 0.6\%$ of the ammonium carbamate is not reacted.

From the 3% ammonium carbamate solution, after 80% of the ammonium carbamate had hydrated, only 1.22% of ammonium bicarbonate would be available to react with any calcium hydroxide present in the concrete. The remaining 1.8% (0.6%+1.2%) would remain as ammonium carbamate in the presence of 0.54% ammonium hydroxide, and retard the hydration of the remaining ammonium carbamate.

Commercial ammonium carbonate is the same double salt that is hydrated from ammonium carbamate, namely $NH_4HCO_3 \cdot NH_2COONH_4$. For a 3% solution of ammonium carbonate, if 80% of the ammonium carbamate of the double salt were to hydrate according the following chemical reaction:

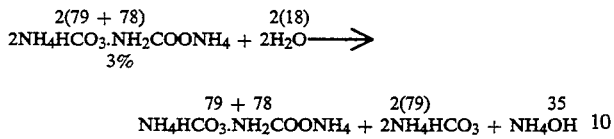

The products of the reaction would be:
(a) (3% ×0.2)=0.6% of the double salt remaining of which about 0.3% is ammonium bicarbonate and about 0.3% is ammonium carbamate;
(b) [(3% ×0.8)/314](158)=1.21% of ammonium bicarbonate produced from hydrating the ammonium carbamate contained in the ammonium carbonate;
(c) [(3% ×0.8)/314](158)=1.21% of ammonium bicarbonate released when the associated ammonium carbamate is hydrated; and
(d) [(3% ×0.8)/314](35)=0.27% ammonium hydroxide.

After hydration of the ammonium carbonate had occurred, the resulting composition would be 0.3% ammonium carbamate, 2.42% ammonium bicarbonate and 0.27% ammonium hydroxide, as set forth in TABLE 1.

TABLE I

| Compound In Solution | Products of Hydration (wt. %) | | | |
|---|---|---|---|---|
| | Ammonium Carbamate | Ammonium Carbonate | Ammonium Bicarbonate | Ammonium Hydroxide |
| Ammonium Carbamate | 1.8 | 2.42* | 1.22 | 0.54 |
| Ammonium Carbonate | 0.3 | 0.6* | 2.42 | 0.27 |

*About one-half of the ammonium carbonate is ammonium bicarbonate and about one-half is ammonium carbamate and these percentages are included in the percentages of ammonium carbamate and ammonium bicarbonate.

These calculations are estimates of the actual percentages of the various products of hydration. They are presented for the purposes of illustrating the relative concentrations of the chemicals which may exist in water solutions, and explaining why ammonium carbamate is less reactive with respect to calcium hydroxide than ammonium carbonate. These calculations also explain why ammonium carbamate is more stable in inhibiting the corrosion of steel in concrete than is ammonium carbonate. The test results described below were performed to find the compositions and methods which would stop and then inhibit the corrosion of steel which is imbedded in concrete.

Testing Procedures

A modified version of the method used by Gouda and Monfore was used to demonstrate the inhibiting effect that both ammonium carbamate and ammonium carbonate have on steel imbedded in concrete, and to determine a method for using these compounds to stop the corrosion of the steel. All tests were conducted at ambient temperature.

The test pieces used in each test were made by cutting cylindrical ¼ inch reinforcing steel into 4⅜ inch lengths. The test pieces were cleaned with a 1-1-1 trichloroethane solvent. The bottom ½ inch of each test piece was then coated with paraffin wax. A ½ inch wide coating of wax was also applied around each of the test pieces at about 3.0 to 3½ inches from the bottom edge. The distance of 2⅞ inches (7.3 cm) between the wax coatings gave an exposed surface area on the test pieces of 14.6 cm².

For each test, the following concrete mixture was used:

| | |
|---|---|
| ¼ inch gravel | 216.5 grams |
| Sand | 84.5 grams |
| Type II Cement | 64.0 grams |
| Sodium chloride | 1.6 grams (2.5 wt. % of cement) |
| Water | 35.0 grams |
| Total | 501.6 grams |

This mix produced a relatively dry concrete, which contained sufficient water to be formed into a cylinder. The sodium chloride was dissolved in and added with the water to approximate the condition that exists in concrete after it has absorbed a solution of salt or sodium chloride which causes the contained reinforcing steel to corrode.

The concrete mix was cast into a cylindrical polystyrene container having a 46 mm diameter and a 107 mm height. Next, 56, 3/16 inch diameter holes were drilled in the side of each container, and 13 holes were drilled into the bottom. A steel test piece was imbedded in each of the cylinders of concrete to a depth of about 3¼ inches, exposing 14.6 cm² of the test pieces to the concrete.

After the concrete set for at least 24 hours, the concrete and imbedded steel test pieces were placed into various solutions of ammonium carbamate or ammonium carbonate to stop the corrosion of the steel. While in the solutions, the steel test pieces were connected into a circuit, as described by Gouda and Monfore, to determine the effect of the inhibitors in stopping the corrosion of the steel.

The test pieces were immersed so that the top of the concrete was approximately even with the top of the solution. The solution was contained in a 1500 ml beaker along with a platinum electrode connected to the negative side of two 1.5 volt batteries connected in series. The positive end of the batteries was connected through two 10,000 ohm resistors, a 2,500 ohm resistor, and a 1,000 ohm resistor, arranged in series. The opposite terminal of the resistors was connected to the positive terminal of an electronic ammeter. The negative pole of the ammeter was connected to the top of the steel piece being tested so as to impose a positive charge upon the steel piece and make it anodic.

In addition to the concrete cylinder and the platinum electrode, a saturated potassium chloride bridge was also immersed in the solution being tested. The bridge was part of a circuit which connected the test solution to a saturated potassium chloride solution in an adjoining container in which a calomel electrode was immersed. The calomel electrode was connected to a terminal of an electronic voltmeter and the other terminal of the voltmeter was connected to the top of the steel test piece. This second circuit was used to measure the potential difference between the calomel electrode and the steel test piece when a positive charge was imposed on the steel test piece to cause a current of about 10 µa/cm² to flow through its surface.

After the corrosion of the steel test piece had been stopped, an anodic coating would build on the test piece and produce a high potential difference between it and the calomel electrode. In those instances when the corrosion produced by the sodium chloride contained in the concrete was not stopped, the test piece became negative relative to the calomel electrode.

The potential difference between the steel test piece and the calomel electrode of each of the corrosion inhibitors was, except for two tests, at a constant current density of about 10 $\mu a/cm^2$.

The following working examples are provided to illustrate some of the advantages of the invention and are not limitative of its scope. All parts and percentages are by weight unless otherwise indicated.

EXAMPLE 1

Test No. G21C1 was conducted to illustrate the effects of not reducing the concentration of chlorides surrounding a steel test piece. Without preliminarily soaking the concrete and imbedded steel test piece in distilled water, or in a water solution of ammonium carbamate, the concrete and steel test piece was immersed in a 2.8% solution of ammonium carbamate in distilled water. The results measured for this test are set forth in TABLE 1.

TABLE 1

Test No. G21C1

| Current $\mu a/cm^2$ | Elapsed time (min) | Voltage (mv) | Remarks |
|---|---|---|---|
| 0 | 0 | −205 | no imposed current on steel electrode |
| 13 | 10 | −7 | 190 $\mu a$ flowed through exposed 14.6 $cm^2$ of the steel test piece |
| 13 | 20 | −76 | |
| 13 | 30 | −108 | |
| 13 | 40 | −126 | insufficient ammonium carbamate reaching steel to stop corrosion |
| 13 | 50 | −139 | |
| 13 | 60 | −146 | |
| 13 | 460 | −177 | |
| The applied current was turned off until following day. | | | |
| 13 | 1340 | −390 | no imposed current on steel test piece |
| 13 | 1350 | −500 | 190 $\mu a$ flowed through the test piece |
| 13 | 1360 | −69 | sufficient ammonium carbamate apparently reaching electrode to begin to form an anodic coating |
| 13 | 1370 | +80 | |
| 13 | 1380 | +163 | |
| 13 | 1390 | +171 | |
| 13 | 1400 | +131 | small mobile chloride ions causing erratic voltage |
| 13 | 1410 | +112 | |
| 13 | 1420 | +180 | |
| 13 | 1430 | −20 | chloride ions again dissolving the anodic coating, exposing the test piece to further corrosion |
| 13 | 1440 | −30 | |
| 13 | 1450 | −57 | |

EXAMPLE 2

In Test No. G24C1, the concrete and imbedded steel test piece was preliminarily immersed overnight in a 3% water solution of ammonium carbamate. The results of this test are reported in TABLE 2. Comparing these results with those for Test No. G21C1 given in TABLE 1, the preliminary immersion at least partially reduced the concentration of the chloride ions in the vicinity of the electrode, and also transported some amount of ammonium carbamate directly to the electrode.

TABLE 2

Test No. G24C1

| Current $\mu a/cm^2$ | Elapsed time (min) | Voltage (mv) | Remarks |
|---|---|---|---|
| 0 | 0 | −250 | no imposed current on steel electrode |
| 8.5 | 10 | −210 | 125 $\mu a$ flowed through the steel |
| 8.5 | 20 | −29 | |
| 8.5 | 30 | +170 | soaking the test piece overnight in a 3% solution of ammonium carbamate enabled sufficient ammonium carbamate to reach the steel and form an anodic coating, but the chloride ions were so mobile that positive charge on the steel attracted sufficient chloride ions to dissolve the anodic coating and leave it exposed to corrosion |
| 8.5 | 40 | +400 | |
| 8.5 | 50 | +480 | |
| 8.5 | 55 | +505 | |
| 8.5 | 60 | +495 | |
| 8.5 | 70 | +395 | |
| 8.5 | 80 | +270 | |
| 8.5 | 90 | +153 | |
| 8.5 | 100 | +74 | |
| 8.5 | 110 | +74 | |
| 8.5 | 120 | +58 | |
| 8.5 | 130 | +56 | |
| 8.5 | 140 | +73 | |
| 8.5 | 155 | +50 | |
| 8.5 | 160 | +97 | |
| 8.5 | 170 | +72 | |

EXAMPLE 3

Test No. G28C1 was conducted to determine a method to remove a maximum percentage of the chloride ions within the concrete from the test piece surface and the surrounding area, which also allows the ammonium carbamate to move through the concrete and build an anodic coating on the test piece.

In this test, the concrete and imbedded steel test piece was immersed in distilled water for two days to draw a maximum amount of the chloride ions from within the concrete. After the two-day period, the water containing the chloride ions was removed and the test piece was placed in a water solution containing 6% ammonium carbamate. To allow the ammonium carbamate sufficient time to reach the test piece, the test piece was immersed in this solution for one day. At the end of one day, a positive voltage was imposed on the electrode and 150 $\mu a$ was caused to flow through it. The results of this test are illustrated in TABLE 3.

TABLE 3

Test No. G28C1

| Current $\mu a/cm^2$ | Elapsed time (min) | Voltage (mv) | Remarks |
|---|---|---|---|
| 0 | 0 | −350 | no imposed current on the electrode |
| 10 | 10 | −50 | 150 $\mu a$ flowed through steel |
| 10 | 15 | +10 | |
| 10 | 20 | +144 | The two day immersion in distilled water removed sufficient chloride ions from the electrode to enable the additional one day immersion in a 6% solution of ammonium carbamate to reach the steel test piece and promote |

TABLE 3-continued

Test No. G28C1

| Current μa/cm² | Elapsed time (min) | Voltage (mv) | Remarks |
|---|---|---|---|
|  |  |  | formation of an anodic coating on the electrode to inhibit further corrosion of the test piece. |
| 10 | 25 | +234 |  |
| 10 | 30 | +440 |  |
| 10 | 35 | +515 |  |
| 10 | 40 | +555 |  |
| 10 | 45 | +625 |  |
| 10 | 50 | +645 |  |
| 10 | 55 | +655 |  |
| 10 | 60 | +665 |  |
| 10 | 65 | +670 |  |
| 10 | 70 | +677 |  |
| 10 | 75 | +680 |  |
| 10 | 80 | +685 |  |
| 10 | 85 | +685 |  |
| 10 | 90 | +685 |  |
| 10 | 95 | +690 |  |

EXAMPLE 4

In Test No. G28C2, the test piece, as in Test No. G28C1, was immersed in distilled water for two days to draw a maximum amount of the chloride ions away from the concrete. After two days, the water was removed and the concrete and test piece was placed in a 3% solution of ammonium carbamate for one additional day before an electric current was applied to the electrode to make it anodic. The lower 3% concentration of ammonium carbamate was used to determine the effect of the solution concentration on the test results. The results are set forth in TABLE 4.

TABLE 4

Test No. G28C2

| Current μa/cm² | Elapsed time (min) | Voltage (mv) | Remarks |
|---|---|---|---|
| 0 | 0 | −285 | no imposed current on electrode |
| 10 | 5 | −61 | 150 μa flowing through steel |
| 10 | 10 | −30 |  |
| 10 | 15 | +75 | As in Test No. G28C1, the two day immersion in distilled water drew enough chlorides away from the electrode to allow the additional one day soak in a 3% solution of ammonium carbamate to penetrate the concrete and promote formation of an anodic coating on the electrode and inhibit further corrosion of the steel test piece. |
| 10 | 20 | +182 |  |
| 10 | 25 | +430 |  |
| 10 | 30 | +535 |  |
| 10 | 35 | +590 |  |
| 10 | 40 | +620 |  |
| 10 | 45 | +640 |  |
| 10 | 50 | +653 |  |
| 10 | 55 | +665 |  |
| 10 | 60 | +670 |  |
| 10 | 65 | +675 |  |
| 10 | 70 | +680 |  |
| 10 | 75 | +685 |  |
| 10 | 80 | +687 |  |
| 10 | 85 | +685 |  |
| 10 | 90 | +690 |  |

As explained above, at least one part of ammonium carbamate is required to inhibit the corrosion of about 0.6 parts of chloride. Furthermore, to inhibit corrosion it is important to reduce the concentration of chloride and to increase the concentration of the ammonium carbamate in the area of the test piece surface. Based on the results of Examples 3 and 4, the two day immersion in distilled water drew a sufficient amount of chloride ions from the test pieces to enable the ammonium carbamate solutions to penetrate the concrete and build an anodic coating on the imbedded steel and inhibit corrosion.

Regarding the rate of build up of the anodic coating, the test results indicate that there is a minor difference between the effects of 3% and 6% solutions of ammonium carbamate. Because the amount of chloride, and the porosity and general condition of the concrete may vary significantly, the concentration of ammonium carbamate in the applied solutions and the amount of time the solutions are applied to the concrete have to be controlled as mandated by the encountered conditions. For example, for increasing levels of porosity or decreasing concentration of chloride, a smaller application period would be needed because the ammonium carbamate would be able to reach the test piece in a decreasing amount of time. Also, the temperature of the environment may affect the rate at which the corrosion inhibitor reaches the test piece.

EXAMPLE 5

In this test, ammonium carbonate was used as the corrosion inhibitor. It was learned that a two day immersion of the concrete and test piece in distilled water, followed by a one day immersion in an ammonium carbonate solution does not, under the test conditions, stop the corrosion of imbedded steel. It was determined that additional measures are required for this purpose. Particularly, a procedure was sought to draw a larger percentage of chloride ions away from the steel test piece, and further to prevent the ammonium carbonate from being precipitated by any calcium hydroxide present in the concrete as a product of setting.

It was determined that the following procedure achieves both objectives: (1) immersing the concrete and test piece in distilled water for two days; (2) while still immersed in the distilled water, making the steel test piece cathodic and the platinum electrode anodic, so as to drive the negative chloride ions, $Cl^-$, away from the steel test piece and into the surrounding water; and (3) after the reverse current treatment of the steel test piece, removing the water containing chloride ions and possibly calcium hydroxide and then placing the concrete and test piece in a water solution containing 4.1% ammonium carbonate and an agent which prevents calcium hydroxide from precipitating ammonium carbonate as calcium carbonate.

Such an agent has to either precipitate or complex calcium. Suitable reagents are, for example, the ortho and polyphosphates, sodium carbonate, the sodium or potassium silicates, and chelating agents such as EDTA. Because concrete is a calcium silicate, sodium silicate was selected as the agent to use in this test to precipitate any calcium hydroxide present. Because sodium silicate produces a silica gel in ammonium carbonate solutions, a weak solution of sodium silicate must be used. A 0.25% solution of Philadelphia Quartz's "O" Silicate was determined to be a suitable solution. The concrete and imbedded steel test piece was immersed in a solution of 4.1% ammonium carbonate plus 0.25% "O" Silicate for one day before the test was started.

At regular time intervals during the test, the pH of the solution was measured and recorded, and the concentration of chloride in the solution was measured and recorded.

The test piece in this Test No. J12C1 was made cathodic with a current of 300 μa, or 20 μa/cm², flowing through it. The test results are given in TABLE 5.

TABLE 5

Test No. J12C1

| Elapsed time (min) | Voltage (mv) | pH | [Cl⁻] (ppm) | REMARKS |
|---|---|---|---|---|
| 0 | −775 | 8.68 | | |
| 10 | −740 | | | |
| 20 | −770 | | | |
| 30 | −790 | | | |
| 40 | −804 | | | |
| 50 | −820 | | | |
| 60 | −830 | 8.80 | 320 | |
| 70 | −703 | | | |
| 80 | −840 | | | |
| 90 | −855 | | | |
| 100 | −860 | | | chloride concentration not increasing and large negative voltage suggested that coating had been removed from electrode, and that additional reverse current will remove little additional chlorides from test piece |
| 110 | −865 | | | |
| 120 | −885 | 8.82 | 320 | |
| 130 | −835 | | | |
| 140 | −1500 | | | |
| 150 | −953 | | | |
| 160 | −953 | | | |
| 170 | −950 | | | |
| 180 | −925 | 8.71 | 310 | |

In this test, 1.6 grams of sodium chloride was added to the 500 gram mix. About 450 grams of this mix was formed into a concrete test piece. The concrete contained 1.6(450/500)=1.44 grams of sodium chloride, or (1.44/58.5)35.5=0.87 gram of chloride. At a concentration of 320 ppm of chloride in 1100 grams of test solution, the test solution contained 0.000320×1100=0.352 gram of chloride that had been drawn out of the concrete. This procedure removed 0.352 g/0.87 g=40% of the chloride from the test piece.

The data reported below in TABLE 6 give the potential between the steel test piece imbedded in concrete, treated as described above, and then immersed in a 4.1% water solution of ammonium carbonate plus 0.25% of "O" silicate. The electrode was made anodic relative to a calomel electrode and 150 μa of current was caused to flow through the 14.6 cm² of exposed electrode. TABLE 6 illustrates the results measured for this test.

TABLE 6

| Current μa/cm² | Elapsed time (min) | Voltage (mv) | Remarks |
|---|---|---|---|
| 0 | 0 | 0 | no imposed current on electrode |
| 10 | 15 | −675 | 150 μa flowed through the steel |
| 10 | 25 | −648 | as test began, high negative voltage indicated that anodic coating had been removed from electrode |
| 10 | 35 | −628 | |
| 10 | 45 | −620 | |
| 10 | 55 | −603 | |
| 10 | 65 | −591 | |
| 10 | 75 | −579 | readings showed voltage becoming increasingly positive, indicating that anodic coating was forming |
| 10 | 85 | −573 | |
| 10 | 95 | −562 | |
| 10 | 105 | −553 | |
| 10 | 115 | −546 | |
| 10 | 125 | −530 | |
| 10 | 135 | −520 | |
| 10 | 155 | −471 | |
| 10 | 165 | −420 | |
| 10 | 175 | −318 | |
| 10 | 185 | −230 | |
| 10 | 195 | −150 | |
| 10 | 205 | 0 | |
| 10 | 215 | −10 | |
| 10 | 220 | +62 | |
| 10 | 225 | +123 | |

The anodic coating was building and test stopped overnight.

| | | | |
|---|---|---|---|
| 0 | 0 | −250 | no current imposed on electrode |
| 10 | 5 | −150 | 150 μa flowing through electrode |
| 10 | 10 | −72 | |
| 10 | 15 | +3 | |
| 10 | 20 | +123 | |
| 10 | 25 | +220 | |
| 10 | 30 | +302 | |
| 10 | 35 | +380 | |
| 10 | 40 | +442 | |
| 10 | 45 | +499 | |
| 10 | 50 | +551 | The corrosion of the test piece was stopped. |
| 10 | 60 | +620 | |
| 10 | 70 | +630 | |
| 10 | 80 | +642 | |
| 10 | 90 | +646 | |
| 10 | 100 | +650 | |

EXAMPLE 6

This test, Test No. J28C1, was a duplicate of Example 5 so as to confirm the results of Test No. J12C1. The steel test piece was made cathodic and a current of 300 μa, or 20 μa/cm², was caused to flow through it.

TABLE 7

Test No. J28C1

| Elapsed time (min) | Voltage (mv) | pH | [Cl⁻] (ppm) | REMARKS |
|---|---|---|---|---|
| 0 | −420 | 11.63 | 180 | |
| 10 | −455 | | | |
| 20 | −602 | | | |
| 30 | −650 | | | |
| 40 | −655 | | | current flow erratic, voltage was −1000mv five minutes earlier |
| 50 | −850 | 11.62 | 180 | |
| 60 | −760 | | | |
| 70 | −725 | | | |
| 80 | −880 | | | |
| 90 | −950 | | | |
| 100 | −710 | 11.67 | 180 | |
| 120 | −790 | | | |
| 130 | −985 | | | |
| 140 | −800 | | | |
| 150 | −775 | | | |

The applied electric current was turned off overnight.

| | −475 | 11.40 | 190 | |
| | −670 | | | |
| | −750 | | | |
| | −835 | 11.35 | 200 | |

As in Test No. J12C1, there were about 1.44 grams of sodium chloride, or 0.87 grams of chloride, in the concrete. An amount of 200 ppm of chloride in 1100 grams of solution equals 0.22 grams of chloride removed from the concrete. This amount indicates that 0.22 g/0.87 g=25% of the chloride was leached from the concrete. This percentage is only 25%/40%=63% of the amount of chloride leached in Test No. J12C1. Although a lower percentage of chlorides had been removed, the ammonium carbonate still inhibited the corrosion of the imbedded steel.

As in Test No. J12C1, the data reported in TABLE 8 below give the potential between the steel test piece imbedded in concrete, treated as described above, and then immersed in a 4.1% water solution of ammonium carbonate plus 0.25% of "O" silicate. The electrode was made anodic relative to a calomel electrode and 150 $\mu$a of current was caused to flow through the 14.6 cm$^2$ of exposed electrode.

TABLE 8

Test No. J28C1

| Current $\mu$a/cm$^2$ | Elapsed time (min) | Voltage (mv) | Remarks |
|---|---|---|---|
| 0 | 0 | −675 | no current imposed on electrode |
| 10 | 5 | −628 | 150 $\mu$a flowed through the steel |
| 10 | 15 | −598 | as test started, high negative voltage indicated that anodic coating had been removed from electrode |
| 10 | 25 | −574 | |
| 10 | 35 | −555 | |
| 10 | 45 | −539 | |
| 10 | 55 | −524 | |
| 10 | 65 | −502 | each reading showed voltage becoming increasingly positive, indicating that anodic coating was forming and corrosion stopped |
| 10 | 75 | −477 | |
| 10 | 85 | −437 | |
| 10 | 95 | −368 | |
| 10 | 105 | −272 | |
| 10 | 115 | −200 | |
| 10 | 125 | −122 | |
| 10 | 135 | −55 | |
| 10 | 145 | +52 | |
| 10 | 155 | +173 | |
| 10 | 165 | +300 | corrosion stopped |
| 10 | 175 | +447 | |
| 10 | 185 | +518 | |
| 10 | 195 | +551 | |
| 10 | 205 | +574 | |
| 10 | 215 | +576 | |

It will be apparent to those skilled in the art that the described method is suitable for use with metals other than mild steel. For example, it may be used for other types of ferrous-based metals such as steel and cast iron. In addition, the method is suitable for use in situations where the source of chloride ions is other than sodium chloride.

In addition, it will be apparent to those skilled in the art that instead of immersing the concrete and imbedded metal in water and then in a corrosion inhibiting solution, the water and solution may optionally be applied to the concrete by spraying and the like.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. A method for inhibiting corrosion of a metal imbedded in concrete which contains a chloride, comprising the steps of:
    applying water to the concrete to draw chloride ions away from the metal and into the water;
    imposing a negative voltage to the metal to cause electric current to flow through the metal and repel chloride ions away from the metal and into the water;
    removing the water containing chloride ions; and
    applying a composition comprising a corrosion inhibiting effective amount of ammonium carbonate to the concrete.

2. The method of claim 1, wherein water is applied to substantially the entire outer surface of the concrete.

3. The method of claim 2, wherein water is applied to the concrete by immersing concrete in water.

4. The method of claim 2, wherein the water is distilled water.

5. The method of claim 1, wherein the concrete further contains calcium hydroxide, and the steps of applying water to the concrete and imposing a negative voltage to the metal draw calcium hydroxide away from the metal and into the water.

6. The method of claim 1, wherein the step of imposing a negative voltage to the metal comprises applying a sufficient negative voltage to cause about 20 $\mu$a/cm$^2$ of electric current to flow through the metal.

7. The method of claim 1, wherein the composition is a water solution of ammonium carbonate.

8. The method of claim 7, wherein the water solution comprises an effective amount of ammonium carbonate to inhibit the corrosion of the metal by the chloride ions.

9. The method of claim 8, wherein the water solution is applied to the concrete for an effective amount of time to allow the ammonium carbonate to reach the metal and form an anodic coating on the metal surface.

10. The method of claim 5, wherein the composition further comprises an effective amount of an agent to inhibit the calcium hydroxide from precipitating the ammonium carbonate as calcium carbonate.

11. The method of claim 10, wherein the agent is sodium silicate.

12. The method of claim 1, wherein the chloride is sodium chloride.

13. The method of claim 11, wherein the metal is a ferrous-based metal.

14. A method for inhibiting the corrosion of a metal imbedded in concrete which contains a chloride, comprising the steps of:
    applying water to the concrete to draw chloride ions away from the metal and into the water;
    removing the water containing chloride ions; and
    applying a composition comprising a corrosion inhibiting effective amount of ammonium carbamate to the concrete.

15. The method of claim 14, wherein water is applied to substantially the entire outer surface of the concrete.

16. The method of claim 15, wherein water is applied to the concrete by immersing concrete in water.

17. The method of claim 15, wherein the water is distilled water.

18. The method of claim 14, wherein the concrete further contains calcium hydroxide, and the step of applying water to the concrete draws calcium hydroxide away from the metal and into the water.

19. The method of claim 14, wherein the composition is a water solution of ammonium carbamate.

20. The method of claim 19, wherein the water solution comprises an effective amount of ammonium carbamate to inhibit the corrosion of the metal by the chloride ions.

21. The method of claim 20, wherein the water solution is applied to the concrete for an effective amount of time to allow the ammonium carbamate to reach the metal and form an anodic coating on the metal surface.

22. The method of claim 14, wherein the chloride is sodium chloride.

23. The method of claim 22, wherein the metal is a ferrous-based metal.

* * * * *

UNITED STATES PATENT AND TRADEMARK OFFICE
CERTIFICATE OF CORRECTION

PATENT NO. : 5,391,349
DATED : February 21, 1995
INVENTOR(S) : Charles N. Hansen Page 1 of 3

It is certified that error appears in the above-indentified patent and that said Letters Patent is hereby corrected as shown below:

Column 2, line 15, "$2e^{31}$" should read --$2e^-$--.

In columns 14-16, claims 8-23 should be replaced with the corrected claims 8-21 as follows:

8. The method of claim 7, wherein the water solution is applied to the concrete for an effective amount of time to allow the ammonium carbonate to reach the metal and form an anodic coating on the metal surface.

9. The method of claim 5, wherein the composition further comprises an effective amount of an agent to inhibit the calcium hydroxide from precipitating the ammonium carbonate as calcium carbonate.

10. The method of claim 9, wherein the agent is sodium silicate.

11. The method of claim 1, wherein the chloride is sodium chloride.

12. The method of claim 10, wherein the metal is a ferrous-based metal.

UNITED STATES PATENT AND TRADEMARK OFFICE
CERTIFICATE OF CORRECTION

PATENT NO. : 5,391,349
DATED : February 21, 1995
INVENTOR(S) : Charles N. Hansen It is certified that error appears in the above-indentified patent and that said Letters Patent is hereby corrected as shown below:

13. A method for inhibiting the corrosion of a metal imbedded in concrete which contains a chloride, comprising the steps of:
    applying water to the concrete to draw chloride ions away from the metal and into the water;
    removing the water containing chloride ions; and
    applying a composition comprising a corrosion inhibiting effective amount of ammonium carbamate to the concrete.

14. The method of claim 13, wherein water is applied to substantially the entire outer surface of the concrete.

15. The method of claim 14, wherein water is applied to the concrete by immersing concrete in water.

16. The method of claim 14, wherein the water is distilled water.

17. The method of claim 13, wherein the concrete further contains calcium hydroxide, and the step of applying water to the concrete draws calcium hydroxide away from the metal and into the water.

18. The method of claim 13, wherein the composition is a water solution of ammonium carbamate.

UNITED STATES PATENT AND TRADEMARK OFFICE
CERTIFICATE OF CORRECTION

PATENT NO. : 5,391,349
DATED : February 21 1995
INVENTOR(S) : Charles N. Hansen

It is certified that error appears in the above-indentified patent and that said Letters Patent is hereby corrected as shown below:

19. The method of claim 18, wherein the water solution is applied to the concrete for an effective amount of time to allow the ammonium carbamate to reach the metal and form an anodic coating on the metal surface.

20. The method of claim 13, wherein the chloride is sodium chloride.

21. The method of claim 20, wherein the metal is a ferrous-based metal.

Signed and Sealed this

Twenty-third Day of May, 1995

BRUCE LEHMAN

*Attest:*

*Attesting Officer*          Commissioner of Patents and Trademarks